Dec. 11, 1951   F. D. MOYER   2,577,797
MIXING APPARATUS FOR TANKS
Filed May 23, 1950

Inventor:
Frederick D. Moyer,
By Schroeder, Merriam,
Hofgren & Brady, Attys.

Patented Dec. 11, 1951

2,577,797

UNITED STATES PATENT OFFICE 2,577,797

MIXING APPARATUS FOR TANKS

Frederick D. Moyer, Chicago, Ill., assignor to Chicago Bridge & Iron Company, a corporation of Illinois Application May 23, 1950, Serial No. 163,735

7 Claims. (Cl. 259—95)

This invention relates to mixing of liquids in storage tanks, and more particularly to the blending or mixing of relatively light and heavy liquids in such tanks.

In storage tanks, and particularly floating roof tanks, crude oil and natural gasoline are often mixed. The users of the tanks may pump gasoline into the inlet line of the tank expecting the gasoline and crude to mix before reaching the tank. However, the gasoline often fills the inlet line and is delivered into the tank in slugs with very little contamination with the crude. In such instances, the gasoline may stratify below the floating roof of the tank and, because of its volatile nature, losses thereof through evaporation are very costly to the owner. Also under such conditions mainly crude oil is pumped out of the tank since the inlet and outlet lines are connected with the bottom portion thereof, and the lighter liquid remains in the tank.

This invention provides an economical and easily operable means for mixing or blending relatively light and heavy liquids in a storage tank.

The invention will be described with reference to an embodiment illustrated in the accompanying drawing, in which.

Figure 1:
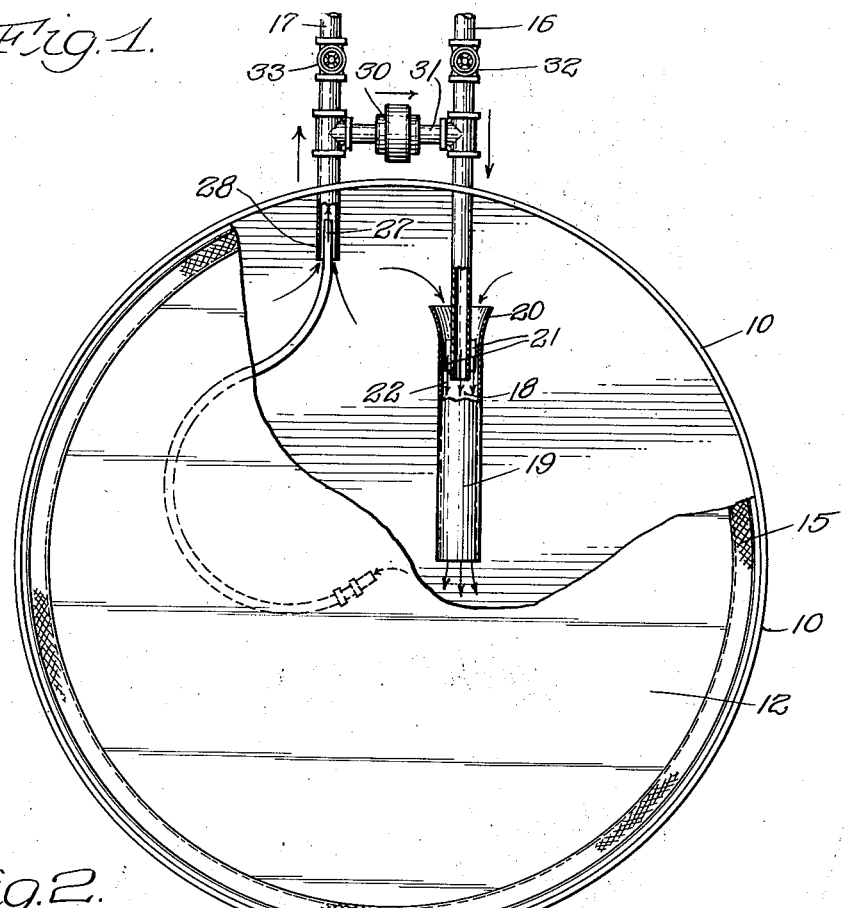
Fig. 1 is a plan view of this invention installed in a storage tank with the apparatus of the invention greatly enlarged and partly in section for clearness of illustration.
Figure 2:
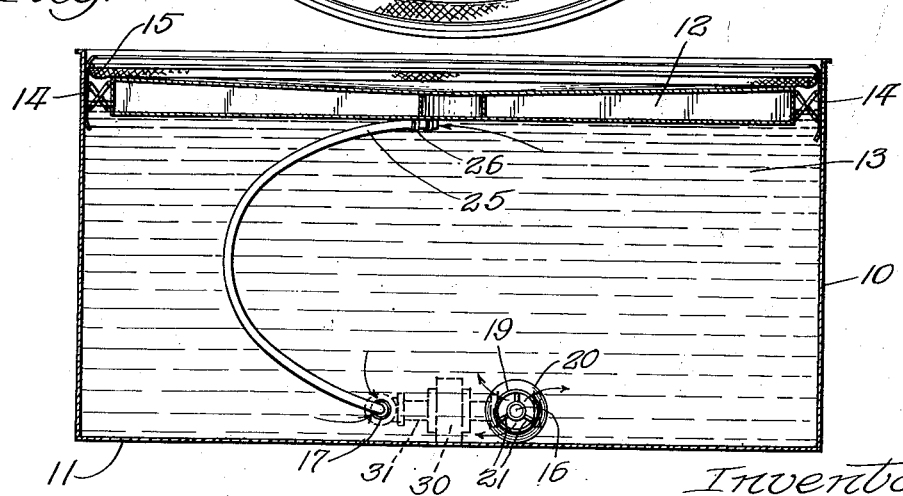
Fig. 2 is a vertical section taken substantially through the center of the tank shown in Fig. 1 looking toward the apparatus of this invention.

The normal floating roof storage tank comprises side walls 10, a bottom 11, and a floating roof 12 adapted to have its lower side in contact with the liquid 13 in the tank. A sealing means 14 is provided between the floating roof 12 and the sides 10 of the tank with a flexible fabric 15 extending therebetween to protect the contents of the tank from contamination from outside sources. An inlet pipe 16 communicates with the lower or bottom portion of the tank and an outlet pipe 17 also communicates therewith. Normally, a pump at a central location removed from the tank, is utilized to force liquid through the inlet pipe into the tank where it may be stored; after which liquid may be withdrawn from the tank, as needed, through the outlet pipe 17.

As liquid is forced into the tank through the inlet pipe 16, a small amount of turbulence occurs at the nozzle end 18 of the inlet pipe. This turbulence ordinarily is not sufficient to effect much mixing of the incoming liquid with the tank contents. An elongated mixing chamber 19, herein shown as being tubular or cylindrical in transverse cross section, is positioned about the nozzle end 18 of the inlet pipe 16. One end 20 of the mixing chamber is flared outwardly, and the chamber is axially aligned with the inlet pipe 16 and held in such position by fins 21 positioned radially between the pipe 16 and the chamber. If desired, the chamber 19 may have a shape of a Venturi tube. The mixing chamber 19 may be mounted in any manner, such as by welding, on the tank bottom 11. As liquid is pumped into the tank, the velocity thereof in the direction of the arrows 22 draws the tank contents in through the flared end 20 of the chamber creating a very turbulent flow through the chamber in the direction of the arrows on Fig. 1. If desired, baffles may be placed on the interior of the mixing chamber to increase the turbulence of the mixing liquids. In this manner, any liquid pumped into the tank is thoroughly mixed and blended with the liquid already in the tank. To secure thorough mixing, the angle of inclination of the inlet pipe with a radial line may be varied with the pumping rate to secure the requisite mixing of the liquids.

The floating roof 12 rises and falls with the rise and fall of the liquid level within the tank. Ordinarily, lighter liquids tend to stratify beneath the roof and unless such stratification is eliminated, only the heavier liquids would ordinarily be withdrawn from the tank through the outlet pipe 17. A flexible tube 25 is attached by U-bolts or similar means 26 to the underside of the floating roof 12. The tube may be a section of hose or a hinged pipe which may collapse or extend as necessary with rise and fall of the floating roof. The lower end 27 of the hose is inserted a short distance into the nozzle end 28 of the outlet pipe 17. By this arrangement the suction on the line 17 draws in the upper tank contents through the flexible tube and into the outlet line 17, as well as drawing in tank contents from the bottom of the tank. Thus any light liquid is mixed in the outlet line with the heavier liquid from the bottom of the tank.

It may be desirable at some times to mix the contents of a liquid storage tank which has been standing for some time without addition or withdrawal of liquid. A pump 30 is placed in a by-pass line 31 extending between the outlet line 17 and the inlet line 16. A valve 32 is placed in the inlet and a valve 33 is likewise placed in the outlet on the outer side of the by-pass line 31. Thus the valves 32 and 33 may be closed and the pump 30 operated to circulate the contents of the tank through the outlet and back into the tank through the inlet pipe thoroughly mixing the lighter and heavier liquids therein. The pump 30 may be provided with controls operable automatically upon stratification of the products in the tank, or may be operable at predetermined time intervals or it may be operated manually when desired.

The foregoing detailed description is given for clearness of understanding only and no unnecessary limitations should be understood therefrom.

I claim:

1. In a liquid storage tank having inlet and outlet pipes communicating with the bottom portion of the tank, means for mixing relatively light and heavy liquids, comprising an elongated mixing chamber having open ends and mounted on the bottom of the tank, said inlet pipe being positioned to direct flow of liquid into the chamber, and a tube within the tank extending between the upper and lower portions thereof, said outlet pipe being positioned about the lower end of the tube to draw liquid both from the tube and from the lower portion of the tank.

2. Apparatus as claimed in claim 1 in which said mixing chamber is axially aligned with the inlet pipe with one end of the chamber positioned about said pipe forming a passage for tank contents between the inlet pipe and chamber.

3. Apparatus as claimed in claim 1 in which said mixing chamber is generally cylindrical with a flared end positioned concentrically about the end of the inlet pipe, said chamber forming a passage around the inlet pipe for admitting tank contents to the chamber.

4. Apparatus as claimed in claim 1 in which pump means are provided between said inlet and outlet pipes outside the tank for circulating liquid in the tank through said inlet and outlet pipes.

5. In a floating roof tank having liquid inlet and outlet pipes communicating with the bottom portion of the tank, means for mixing relatively light and heavy liquids, comprising a generally cylindrical mixing chamber axially aligned with the inlet pipe, said chamber being larger in size than the inlet pipe and having one end positioned about said inlet, and a flexible tube attached to the underside of the roof and extending downwardly into the outlet pipe with a passage around the tube for admitting tank contents to the outlet pipe.

6. Apparatus as claimed in claim 5 in which pump means are provided between the outlet and inlet pipes to circulate tank contents therethrough.

7. In a floating roof tank having inlet and outlet pipes communicating with the bottom portion of the tank, means for mixing relatively light and heavy liquids, comprising an elongated mixing chamber axially aligned with the inlet pipe, one end of said chamber being positioned about the inlet pipe and forming a passage through its length for turbulent mixing of tank contents with incoming liquid, a flexible tube attached at one end to the roof and extending into the outlet pipe, said tube being smaller than the outlet pipe and positioned to draw liquid from the upper portion of the tank into the outlet and pump means for circulating tank contents through said inlet and outlet pipes.

FREDERICK D. MOYER.

REFERENCES CITED

The following references are of record in the file of this patent:

UNITED STATES PATENTS

| Number | Name | Date |
|---|---|---|
| 1,098,811 | Loebel et al. | June 2, 1914 |
| 1,262,962 | Lewis | Apr. 16, 1918 |
| 1,513,975 | Eichelberger | Nov. 4, 1924 |
| 1,754,255 | Bond | Apr. 15, 1930 |
| 1,958,118 | Szegvari | May 8, 1934 |